(12) United States Patent
Swerdlow

(10) Patent No.: US 12,267,180 B2
(45) Date of Patent: *Apr. 1, 2025

(54) DISPLAYING PARTICIPANT INFORMATION PRIOR TO JOINING A CONFERENCE

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,511

(22) Filed: Oct. 16, 2023

(65) Prior Publication Data

US 2024/0039747 A1   Feb. 1, 2024

Related U.S. Application Data

(63) Continuation of application No. 17/472,031, filed on Sep. 10, 2021, now Pat. No. 11,863,333.

(51) Int. Cl.
*H04L 12/18* (2006.01)
*H04L 51/046* (2022.01)

(52) U.S. Cl.
CPC ...... *H04L 12/1818* (2013.01); *H04L 12/1822* (2013.01); *H04L 51/046* (2013.01)

(58) Field of Classification Search
CPC .......... H04L 12/1818; H04L 12/1822; H04L 51/046
See application file for complete search history.

(56) References Cited

U.S. PATENT DOCUMENTS

| | | | |
|---|---|---|---|
| 6,853,398 B2 | 2/2005 | Malzbender et al. | |
| 7,603,412 B2 | 10/2009 | Beyda | |
| 8,437,461 B1 | 5/2013 | Gartner et al. | |
| 8,589,487 B1 | 11/2013 | Reeves et al. | |
| 9,065,874 B2 | 6/2015 | Moyers et al. | |
| 9,146,115 B2 | 9/2015 | Geffner et al. | |
| 9,165,290 B2 | 10/2015 | Wessling et al. | |
| 9,699,411 B2 * | 7/2017 | Nelson | H04M 3/567 |
| 9,912,777 B2 * | 3/2018 | Johar | H04L 67/306 |
| 10,320,856 B2 * | 6/2019 | Rosenberg | H04L 67/141 |
| 10,554,728 B2 * | 2/2020 | Reyes | H04L 67/06 |
| 10,592,867 B2 * | 3/2020 | Rosenberg | H04L 51/046 |

(Continued)

FOREIGN PATENT DOCUMENTS

CN   115705315 A   2/2023

OTHER PUBLICATIONS

International Search Report and Written Opinion mailed on Dec. 13, 2022 in corresponding PCT Application No. PCT/US2022/042864.

(Continued)

*Primary Examiner* — Nazia Naoreen
(74) *Attorney, Agent, or Firm* — Young Basile Hanlon & MacFarlane, P.C.

(57) ABSTRACT

A conference system transmits a first graphical output for display on a panel interface associated with a conference. Prior to the client device joining the conference, the conference system determines participant information based on a request. The conference system transmits a second graphical output to the client device to display the participant information without the client device having to join the conference.

20 Claims, 10 Drawing Sheets

(56) References Cited

U.S. PATENT DOCUMENTS

| | | | |
|---|---|---|---|
| 10,616,369 B1 | 4/2020 | d'Andrea et al. | |
| 11,144,887 B2 | 10/2021 | Wender | |
| 11,245,735 B1 | 2/2022 | Kwatra et al. | |
| 11,349,679 B1 | 5/2022 | Laird-McConnell et al. | |
| 11,488,634 B1 | 11/2022 | Decrop et al. | |
| 11,824,671 B2 | 11/2023 | Swerdlow | |
| 11,863,333 B2 | 1/2024 | Swerdlow | |
| 2003/0097217 A1 | 5/2003 | Wells et al. | |
| 2003/0189601 A1 | 10/2003 | Ben-Shachar et al. | |
| 2005/0069116 A1 | 3/2005 | Murray, II | |
| 2007/0239827 A1 | 10/2007 | Deboy et al. | |
| 2010/0037151 A1 | 2/2010 | Ackerman et al. | |
| 2010/0153160 A1 | 6/2010 | Bezemer et al. | |
| 2010/0198646 A1 | 8/2010 | Mikan et al. | |
| 2010/0274855 A1 | 10/2010 | Wassingbo | |
| 2011/0107228 A1 | 5/2011 | Huang | |
| 2011/0161834 A1 | 6/2011 | Shadfar et al. | |
| 2012/0150577 A1* | 6/2012 | Berg | G06Q 10/0631 705/342 |
| 2012/0185534 A1 | 7/2012 | Zimmet et al. | |
| 2015/0088572 A1 | 3/2015 | Mai et al. | |
| 2015/0281149 A1 | 10/2015 | Masterson et al. | |
| 2016/0269504 A1 | 9/2016 | Johar et al. | |
| 2018/0039951 A1 | 2/2018 | Wynn et al. | |
| 2018/0278891 A1 | 9/2018 | Pan et al. | |
| 2019/0392395 A1 | 12/2019 | Valliani | |
| 2020/0403817 A1 | 12/2020 | Daredia et al. | |
| 2021/0258427 A1 | 8/2021 | Lee et al. | |
| 2022/0078039 A1* | 3/2022 | Cho | G06Q 10/1091 |
| 2022/0141044 A1* | 5/2022 | Burpee | G06Q 10/1093 709/204 |
| 2022/0321616 A1 | 10/2022 | Chopdekar et al. | |
| 2022/0365793 A1 | 11/2022 | Weiss et al. | |

OTHER PUBLICATIONS

Anonymous: "Is it possible to see who is in a currently running meeting without joining it yourself?—Microsoft Community Hub", Nov. 18, 2020 (Nov. 18, 2020), pp. 1-5, XP093005369, Retrieved from the Internet: URL: https://techcommunity.microsoft.com/t5/microsoft-teams/is-it-possible-to-see-who-is-in-a-currently-running-meeting/m-p/1901024 [retrieved on Dec. 6, 2022] p. 1-p. 2.

* cited by examiner

DISPLAYING PARTICIPANT INFORMATION PRIOR TO JOINING A CONFERENCE

CROSS-REFERENCE TO RELATED APPLICATION(S)

This application is a continuation of U.S. patent application Ser. No. 17/472,031, filed Sep. 10, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services accessible over a network, such as the Internet, to deliver a complete communication experience regardless of physical location.

SUMMARY

Disclosed herein are, inter alia, implementations of systems and techniques for enabling access to conference features at a client device without a connection between the client device and a conference.

One aspect of this disclosure is a method that may include obtaining information associated with a conference that is in progress. The method may include transmitting a graphical output to display on a client device. The graphical output may be based on the information. Prior to the client device joining the conference, the method may include receiving a message from the client device to initiate a communication with a participant device that is present in the conference. Prior to the client device joining the conference, the method may include granting the client device access to an in-conference communication application associated with the conference based on the message to communicate with the participant device.

Another aspect of this disclosure is a system for conference messaging. The system may include a server and a client device. The server may be configured to transmit a graphical output associated with a conference that is in progress. The client device may be configured to display the graphical output on a display of the client device. Prior to the client device joining the conference, the server may be configured to receive a message from the client device to initiate a communication with a participant device that is present in the conference. Prior to the client device joining the conference, the server may be configured to grant the client device access to an in-conference communication application associated with the conference based on the message to communicate with the participant device. Prior to the client device joining the conference, the client device may be configured to communicate with the participant device via the in-conference communication application.

Another aspect of this disclosure is a non-transitory computer-readable storage device including program instructions that, when executed by a processor, cause the processor to perform operations. The operations may include obtaining information associated with a conference that is in progress. The operations may include transmitting a graphical output to display on a client device. The graphical output may be based on the information. Prior to the client device joining the conference, the operations may include receiving a message from the client device to initiate a communication with a participant device that is present in the conference. Prior to the client device joining the conference, the operations may include granting the client device access to an in-conference communication application associated with the conference based on the message to communicate with the participant device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
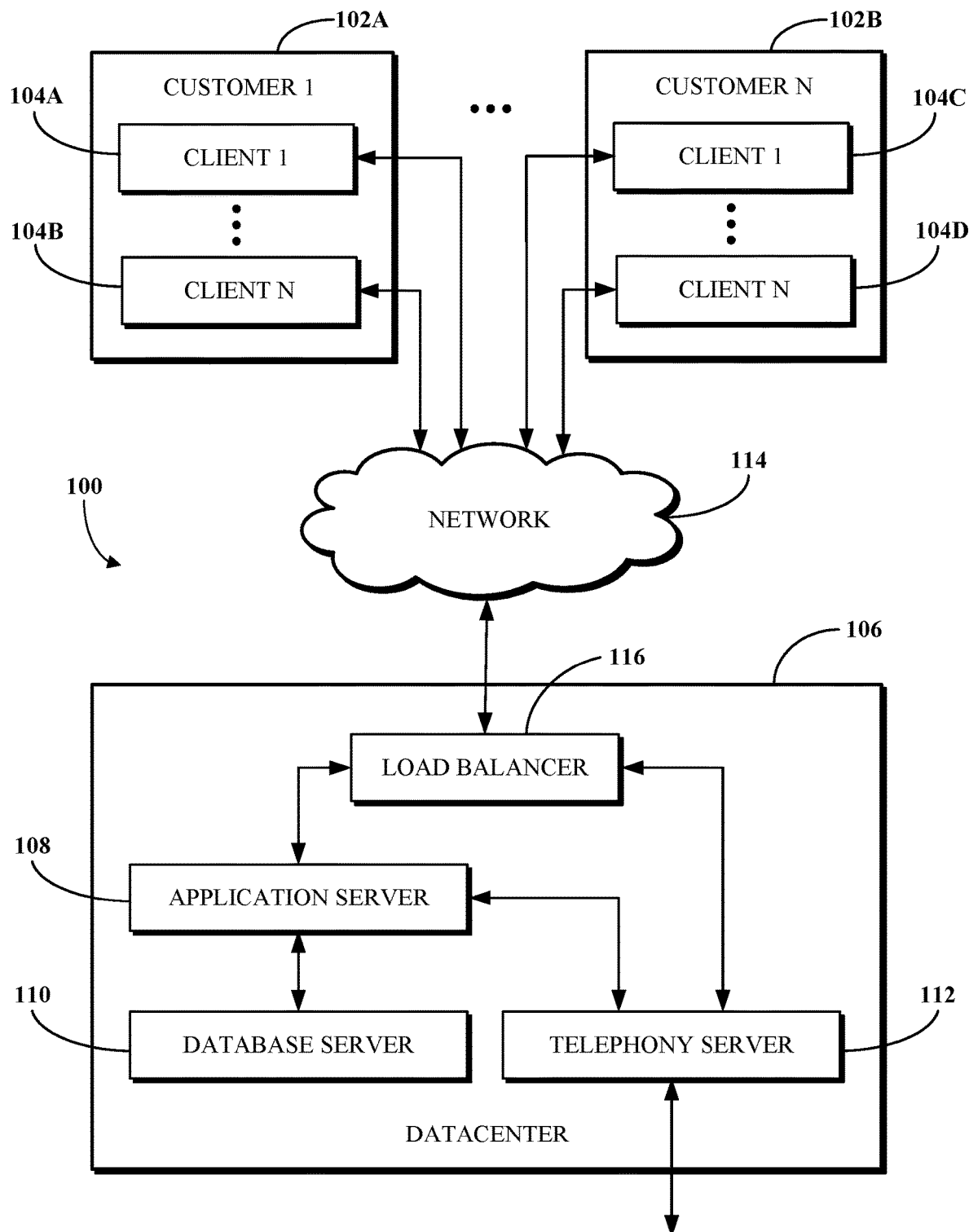
FIG. 1 is a block diagram of an example of an electronic computing and communications system.

A software platform, such as a UCaaS platform, may facilitate a conference between multiple participants, such as over conferencing software of the software platform. Typically, a user of conferencing software must first join a conference before being able to access features of that conference, for example, a list of other participants who have already joined the conference, functionality for messaging those participants who have already joined the conference, and an agenda for the conference. In particular, because conventional conferencing software systems require a channel be opened between a user device and the server implementing a conference before conference features can be accessed by a user, such systems do not allow a user to preview conference features without joining a conference. This technical limitation creates challenges in several types of scenarios, as will be discussed.

In one example, where a user is running late to a conference, the user may find themselves frustrated when they join the conference late only to find out that no other participants have joined or that the stakeholders have not yet joined. Often times the user may leave a current conference early, before it ends, in order to timely join a next conference only to find themselves waiting for other late participants. Knowing in advance which participants have joined such a next conference can help the user determine an appropriate time to join the conference, whether by leaving a current conference or otherwise. However, conventional conferencing software systems do not have the capability to allow a user device to access participant information for a conference without the user device connecting to the conference.

In another example, where a user is running late for a conference in progress, the user may want to contact one or more participants that have already joined the conference to notify them that they are running late or for other purposes. A typical solution is that the user sends an email to all the invitees of the conference; however, this is wasteful and annoying for invitees who declined the conference invitation, and in many cases the conference participants who are actively paying attention to the conference may simply ignore the email message. Conventional conferencing software systems do not have the capability to allow the user, via their user device, to communicate with one or more participants in the conference using an in-conference communication application without the user device connecting to the conference.

In yet another example, a user may join a conference without having any idea of what the conference is about. This could be because the user has consecutive conferences scheduled throughout the day and does not have time to prepare for a particular conference, the user has overlapping scheduled conferences, the user has multiple conferences scheduled for the same time slot, the title of the conference is ambiguous (e.g., "discuss problems"), or any combination thereof. Joining a conference unprepared can be embarrassing for the user and a waste of time for other conference participants while the user is briefed on the missed portion of the conference. In this situation, the user may want to preview one or more conference items prior to joining the conference in progress. The one or more conference items may include, and are not limited to, a list of topics to be addressed during the conference (e.g., an agenda), a presentation (e.g., a screen share), a real-time transcript, or any file or document that is associated with the conference. However, conventional conferencing software systems do not have the capability to allow a user device to access conference items without the user device connecting to the conference.

Implementations of this disclosure address problems such as these a using a conferencing system that enables client device access to one or more conference features prior to the client device joining a conference. The conferencing system may generate and store a conference object when a conference is initiated. The conference object may represent a conference that is in progress, a future conference, or a conference that occurred in the past. The conference object can include a list of conference participants, participant messaging data, one or more conference items, or any combination thereof. Each conference participant is associated with an attribute that indicates whether they accepted the conference invite, declined the conference invite, has joined the conference, a messaging status, a presentation status, an audio status, a video status, or any combination thereof. The participant messaging data may include a log of participant chat messages in a conference chat room, for example.

In an example, to enable a user of a client device to preview the participants in a conference without the client device connecting to the conference, the conferencing system may obtain calendar data to generate a graphical output. The graphical output may be a graphical user interface that includes a conference description, a conference topic or list thereof, a conference start time, a conference end time, a conference location, two or more conference participants, two or more conference participant invite statuses, or any combination thereof. The conferencing system is configured to transmit the graphical output for display on a client device that has not yet joined the conference. The conferencing system is configured to determine participant information. The participant information may include a participant invite status, a participant attendance status, a participant attendance time, a participant audio status, a participant video status, a representation of a participant, or any combination thereof. The participant invite status may include an indicator that indicates whether a given participant accepted or declined the conference invite. The participant attendance status may include an indicator that indicates that a given participant has joined the conference, has not joined the conference, or joined the conference and subsequently left the conference. The participant attendance time may include an indicator that indicates a time that a given participant joined the conference or a duration of time that the participant has been in the conference. The participant audio status may include an indicator that indicates that at a given time a given participant's microphone is on, the participant's microphone is muted, or that the participant is speaking. The participant video status may include an indicator that indicates that at a given time a given participant's video is on, the participant's video is off, or that the participant is presenting in the conference. A representation of the participant may include an avatar, a photograph, an icon, text, or any combination thereof. The conferencing system is configured to transmit a graphical output based on the participant information for display on the client device.

In an example, to enable a user of a client device to message one or more conference participants without the client device connecting to a conference, the conferencing system is configured to obtain information regarding the conference, which may be a conference in-progress. The conference information can include a conference description, a conference topic or list thereof, a conference start time, a conference end time, a conference location, participant information, or any combination thereof. The conferencing system is configured to transmit a graphical output based on the conference information to a client device for display. Prior to the client device joining the conference, the conferencing system is configured to receive a message to initiate a communication with a participant that is in the conference. The communication may be a text communication, such as a chat, an audio communication, such as an audio chat, a video communication, such as a video chat, or any combination thereof. The conferencing system is configured to grant the client device access to communicate with the participant in the conference. In one example, when the client device is granted access to communicate with the participant in the conference, the client device may access an in-conference communication application to communicate with the participant. An in-conference communication application may be a chat room associated with a conference in progress that is configured for text messaging, audio messaging, video messaging, or any combination thereof. In another example, when the client device is granted access to communicate with the participant in the conference, the client device may access a communication application that is not associated with the conference to communicate with the participant.

In an example, to enable a user of a client device to preview one or more conference items without the client device connecting to a conference, the conferencing system is configured to obtain a conference item and transmit a graphical output based on the conference item to a client device for display. The conference item may include an editable document, an agenda or list of topics, a real-time transcript, a downloadable file, or a real-time presentation. The conferencing system is configured to receive a request to view the conference item and transmit a graphical output to the client device based on the request to display the conference item.

To describe some implementations in greater detail, reference is first made to examples of hardware and software structures used to implement a system for providing a client device access to conference features without a connection between the client device and the conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
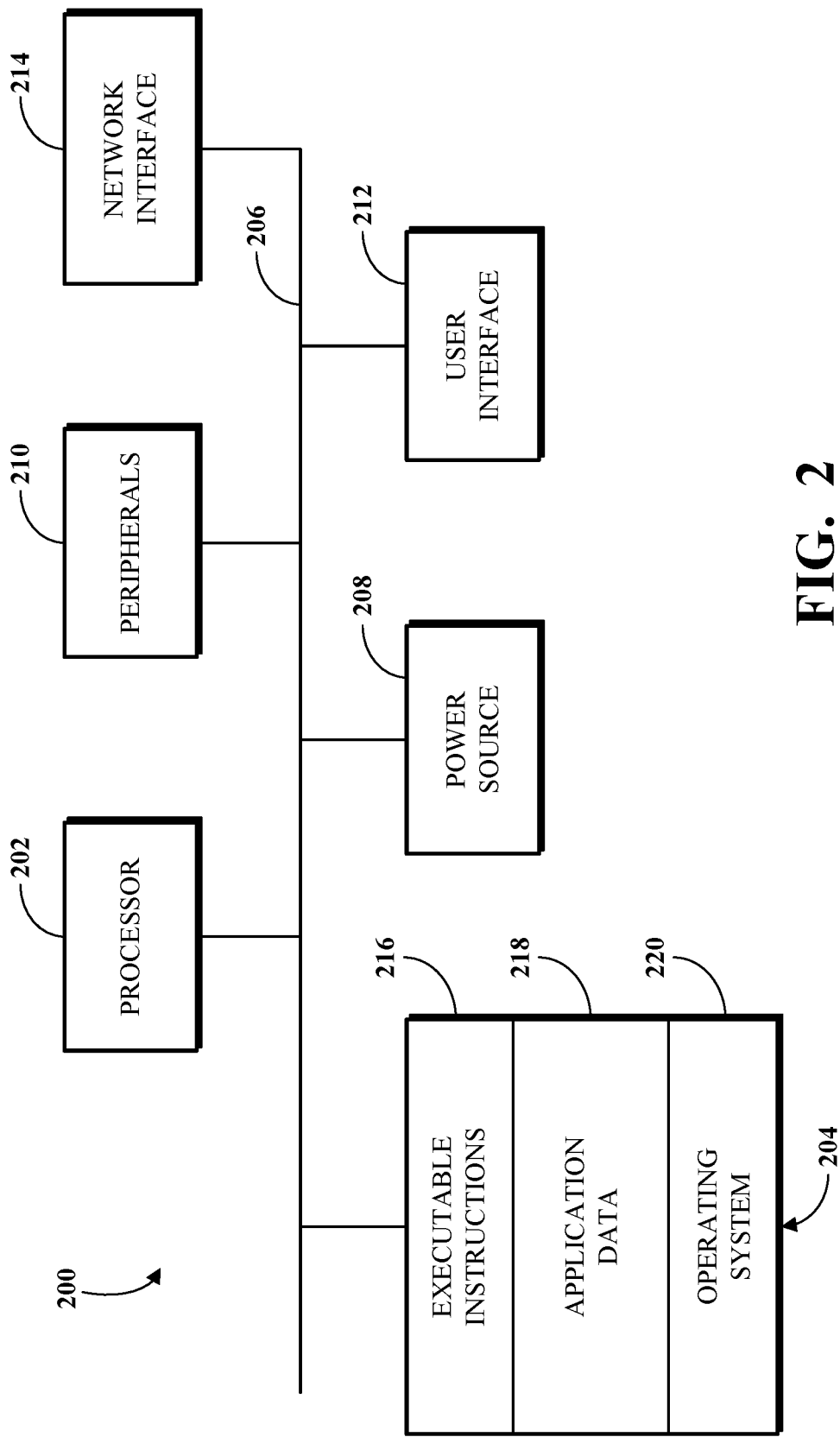
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
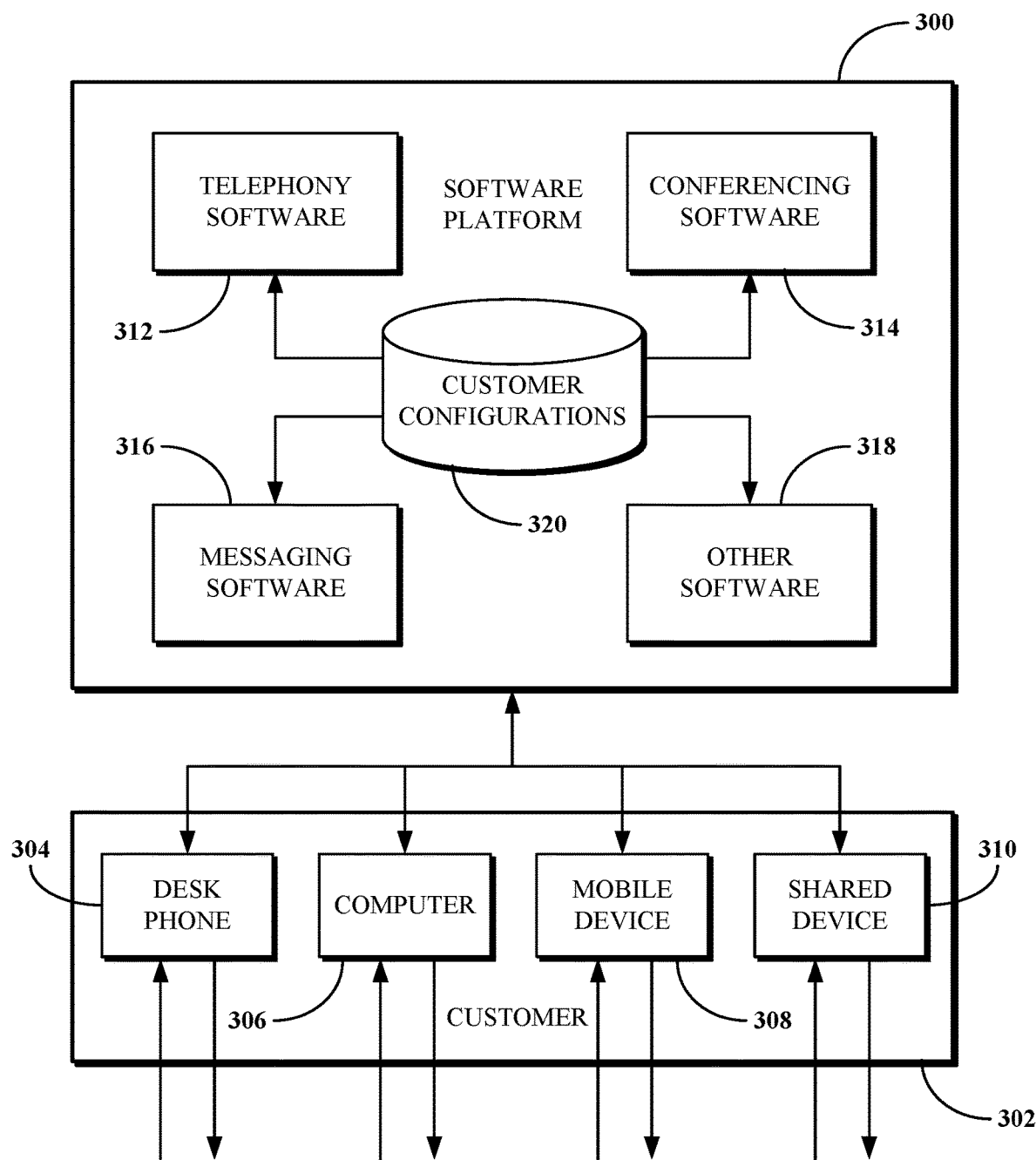
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users. In some implementations, a client may be a vehicle or a component thereof. A vehicle may include an automobile, an aircraft, a watercraft, a spacecraft, a train, a monorail, or a hyperloop.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality to provide a client device with access to conference features without the client device connecting to a conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
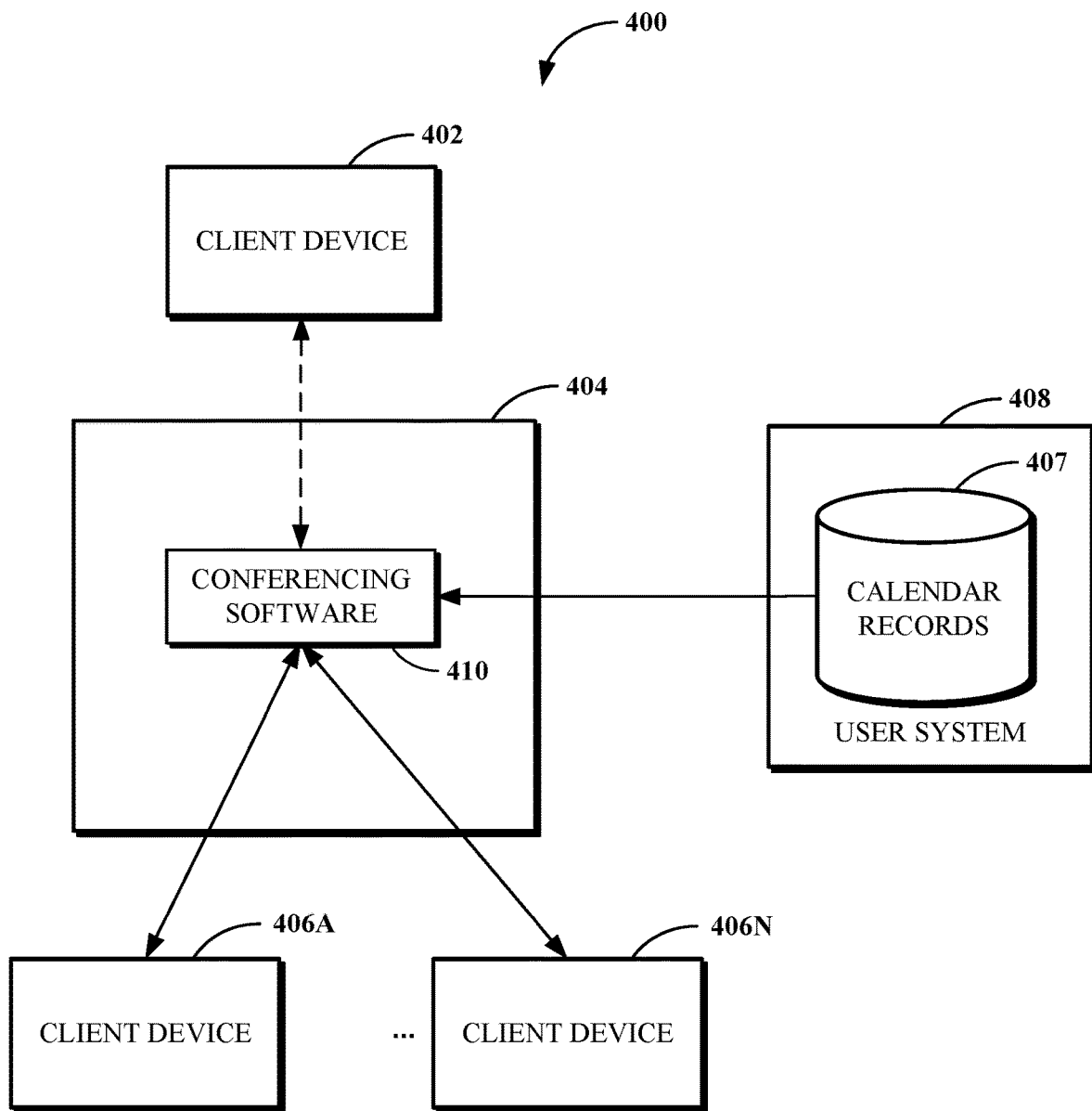
FIG. 4 is a block diagram of an example of a system for providing a client device access to conference features without a connection between the client device and the conference.

FIG. 4 is a block diagram of an example of a system 400 for providing a client device access to conference features without a connection between the client and a conference. For example, the system 400 may be configured to allow a client device to preview conference participants prior to joining the conference, message one or more conference participants prior to joining the conference, view a conference item prior to joining the conference, or any combination thereof. The system 400 includes a client device 402, a server 404, client devices 406A through 406N, and a user system 408. The client device 402 and the client devices 406A through 406N may each be any one of the clients 304 to 310 shown in FIG. 3 or similar types of client devices, whether or not corresponding to a customer of a software platform. The server 404 may be used to implement at least a portion of a software platform which implements conferencing functionality, such as the software platform 300 shown in FIG. 3. In an example, the functionality to provide access to conference features prior to joining a conference may be implemented in the other software 318 shown in FIG. 3. The user system 408 may include or otherwise access a database server, such as the database server 110 shown in FIG. 1, that stores calendar records 407 of users of the system 400. In some examples, the user system 408 may be implemented as a component of the server 404.

The server 404 includes conferencing software 410. The conferencing software 410 may, for example, be the conferencing software 314 shown in FIG. 3. The conferencing software 410 is configured to enable audio, video, and/or other forms of conferences between multiple participants, such as users of the client devices 406A through 406N.

In this example, the client device 402 has not yet joined the conference, and the client devices 406A through 406N have joined the conference. Any one of the users of the client devices 406A through 406N may have initiated the conference. When the conference is initiated, the conferencing software 410 generates a conference object and stores the conference object in a memory of the server 404. Each participant of the conference is associated with an attribute that indicates whether the participant accepted the conference invite, declined the conference invite, or has joined the conference. The conferencing software 410 is configured to detect changes in the conference, update the conference object, and store the updated conference object in the memory of the server 404. The detected changes may include, but are not limited to, a participant joining the conference, a participant leaving the conference, a participant speaking or presenting, a change in audio status of a client device, a change in video status of a client device, a change in a messaging application of the conference, a recording status change, or a change in an agenda or list of topics or other file associated with the conference.

The conferencing software 410 is configured to obtain calendar data from the user system 408. In some examples, the conferencing software 410 may transmit a request for calendar data to the user system 408 to obtain the calendar data. The calendar data may include a description of the conference, an agenda or list of topics for the conference, a conference start time, a conference end time, a location, two or more conference participants, two or more conference participant invite statuses, or any combination thereof. The conferencing software 410 is configured to generate a graphical output based on the calendar data and transmit the graphical output to a client device for display. The graphical output may be transmitted to client device 402, client devices 406A through 406N, or both.

In this example, the client device 402 receives the graphical output and displays the graphical output on a display of the client device 402. The graphical output is displayed as a panel on the display of the client device 402. The panel may be a persistent panel that is an extensible panel that sits on a display of the client device 402 to make the user aware of conference information or real-time communications in one or more modalities and to enable the user to take some action in response to the conference information or real-time communication in a single click regardless of the modality. The panel generally occupies less display space than a typical software application, and, in some cases, the size may be configurable based on user preferences and/or based on a number of applications integrated within the panel. The panel may be persistent such that it remains on top of the display of the client device 402 for immediate viewing at all times, unless otherwise configured. The single-click actions may correspond to response actions including to join the conference, leave the conference, message participants of the conference, turn video on/off, mute/unmute a microphone. In some examples, a single-click action to message participants of the conference may include prewritten messages. The panel may be configured, initialized, or otherwise used within a graphical output using the other software 318 shown in FIG. 3.

In this example, the panel is configured to display information associated with a conference that the client device 402 has not yet joined. The conference can be a conference to which the user was invited as a participant, or a conference that the user created as a host. A portion of the panel may include an indicator that indicates a conference status associated with the conference. The indicator can be a color or an icon. For example, the color may indicate that the conference is in the future, the user is late for the conference (e.g., the conference start time has passed, and no other participants have joined), or that the conference has started (e.g., other participants have joined).

The user of the client device 402 can provide an input to expand the panel to view more information regarding the conference. The input can include hovering a cursor over the portion of the panel, touching the portion of the panel, or pressing one or more keys/buttons, for example, a keyboard shortcut. In response to the input, the client device 402 is configured to transmit a request to the server 404 to obtain conference information. The conferencing software 410 is configured to obtain the conference object from the memory of the server 404 and determine the conference information based on the request. The conferencing software 410 is configured to generate a graphical output based on the determined conference information and transmit the graphical output to the client device 402 for display in the expanded portion of the panel.

In some implementations, the conference information is periodically obtained by the client device 402 without manual user intervention (i.e., without the need for user input) and displayed when the user expands the panel. In some implementations, the conference information is automatically pushed to the client device 402 without the need for a request and displayed when the user expands the panel.

In some implementations, the graphical output may be displayed within a graphical user interface of a client application running at the client device 402 or as a pop-up window. The display of the graphical user interface using the client application or pop-up window may be implemented to make the user aware of conference information or real-time communications in one or more modalities and to enable the user to take some action in response to the conference information or real-time communication in a single click regardless of the modality.

Figure 5:
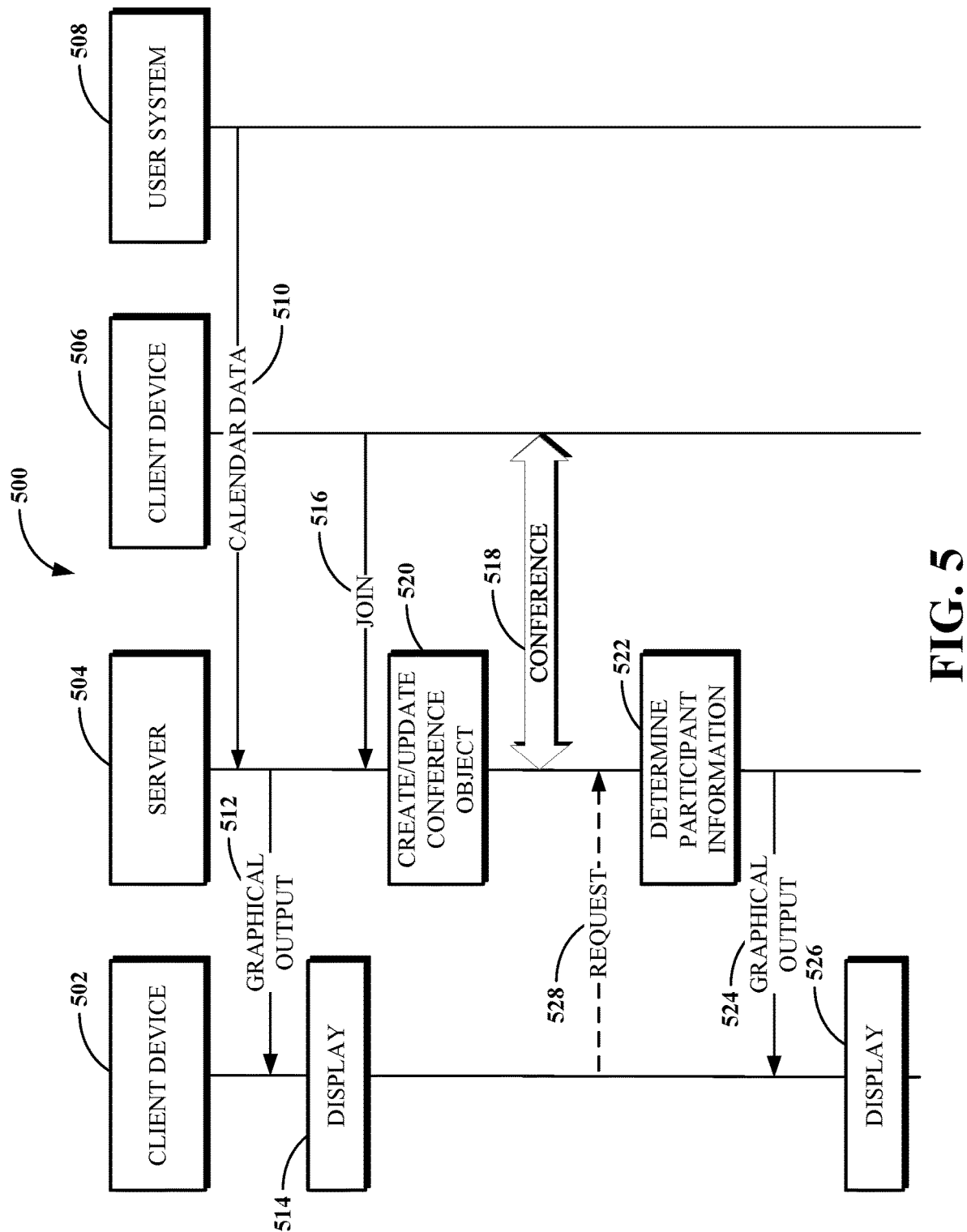
FIG. 5 is a swim lane diagram of an example of a system for providing a client device access to conference participant information without a connection between the client device and the conference.

FIG. 5 is a swim lane diagram of an example of a system 500 for providing a client device access to conference participant information without a connection between the client and the conference. The system 500 includes a client device 502, a server 504, a client device 506, and a user system 508. The client device 502 may be the client device 402 shown in FIG. 4, and the client device 506 may be any one of the client devices 406A to 406N shown in FIG. 4. The server 504 may be the same as server 404 shown in FIG. 4, and may be used to implement the software platform 300 shown in FIG. 3. In an example, the functionality for providing access to conference participant information without having to join the conference may be implemented in the other software 318 shown in FIG. 3. The user system 508 may be a database server, such as database server 110 shown in FIG. 1. In some examples, the user system 508 may be implemented as a component of the server 504.

In this example, a user of the client device 502 may be in a current conference and running late for a next conference. The user would like to preview the participants of the next conference who are in attendance in order to determine when to leave the current conference to join the next conference. Attendance information for the participants of the next conference may be based on calendar data. As shown in FIG. 5, the server 504 is configured to obtain calendar data 510 from the user system 508. The server 504 is configured to generate a graphical output 512 based on the calendar data 510, and transmit the graphical output 512 to the client device 502.

The client device 502 is configured to receive the graphical output 512 and display 514 the graphical output 512, or portions thereof, within a panel on a display of the client device 502. The panel may be configured to display information associated with a conference, for example, a conference that the client device 502 has not yet joined. A portion of the panel may include an indicator that indicates a conference status associated with the conference. The indicator can be a color or an icon. For example, the color may indicate that the conference is a future conference, the conference has started without participants, the conference has started with participants, the conference has started and there is at least one high priority participant in attendance, the conference has an active screen share, or that the conference has ended.

At some point in time, the client device 506 transmits a join message 516 to the server 504 to connect to a conference 518. The conference 518 may be a conference in progress, or it may be a conference that is initiated by the join message 516. The server 504 is configured to receive the join message 516 and create or update 520 a conference object associated with the conference 518. The server 504 grants the client device 506 access to the conference 518, and the client device 506 joins the conference 518, for example, via conferencing software 410 shown in FIG. 4.

At this point, the client device 502 has not yet joined the conference 518. The server 504 is configured to determine 522 participant information. The participant information is determined based on the conference object, and may include a participant invite status for one or more participants, a participant attendance status for one or more participants, a participant attendance time for one or more participants, a participant preview status for one or more participants, a participant indicator for one or more participants, such as a participant name, or representation thereof, a participant audio status for one or more participants, a participant video status for one or more participants, a participant presentation status for one or more participants, or any combination thereof.

The participant invite status may indicate whether the participant accepted or declined the conference invite. The participant attendance status may indicate that the participant has joined the conference, has not joined the conference, or joined the conference and subsequently left the conference. The participant attendance time may indicate a time that the participant joined the conference or a duration of time that the participant has been in the conference. The participant preview status may indicate whether the participant is currently previewing the conference or has previewed the conference within a predetermined period of time. The participant audio status may indicate that the participant microphone is on, the participant microphone is muted, or that the participant is speaking. The participant video status may indicate that the participant video is on, the participant video is off, or that the participant is presenting in the conference. A representation of the participant may include an avatar, a photograph, an icon, text, or any combination thereof. The participant presentation status may be an indication of whether the participant is currently performing a screen share.

The server 504 is configured to generate a graphical output 524 based on the participant information and transmit the graphical output 524 to the client device 502. The client device 502 is configured to receive the graphical output 524 and display 526 at least a portion thereof in an expanded portion of the panel. The graphical output 524 may include one or more visual indicators. For example, a visual indicator may indicate whether a participant has their video or audio on or off based on the participant video status or the participant audio status. A visual indicator may indicate who is speaking in the conference based on the participant audio status. A visual indicator may indicate a duration of time that the participant has been in the conference based on participant attendance time. A visual indicator may indicate that a participant is performing a screen share based on the participant presentation status. A visual indicator may indicate whether the conference is being recorded based on the conference status.

In some implementations, the client device 502 may transmit a request 528 for participant information to the server 504. The request 528 may be transmitted in response to an input from a user to expand the panel to view more information, such as participant information. In some implementations, the graphical output 524 is periodically transmitted to the client device 502 without the need for an input, and displayed when the user expands the panel. In some implementations, the graphical output 524 is automatically pushed to the client device 502 when there is an update to the conference object, without the need for the request 528, and displayed when the user expands the panel.

In some implementations, the server 504 may transmit a notification to the client device 502 to notify the user that a high priority participant has joined or left the conference 518. A high priority participant may be a supervisor of the user or other stakeholder. In this example, the server 504 may determine a priority level for a participant based on an organizational structure or a user preference. The server 504 may determine the priority level using a machine learning (ML) model and historical conference data of the user and one or more other users of the system 500. In some examples, a priority level for each participant may be determined.

In some implementations, the server 504 may transmit a notification to a client device that has not yet joined the conference 518, such as the client device 502, to notify the user that a threshold of participants for a quorum has been reached in the conference 518. The threshold may be based on a percentage, for example, the number of participants that have joined the conference 518 relative to the number of participants that accepted the conference invite. The threshold may be a configurable value. In an example, the notification may be transmitted when 50% of the participants that accepted the conference invite have joined the conference 518. In some examples, a notification may be transmitted when quorum is lost, for example, when a participant leaves the conference 518.

In some situations, it may be helpful to see who is previewing the conference or how many participants are previewing the conference, for example, to avoid a situation where no one is joining the conference because the conference is empty. In some implementations, the server 504 may transmit a notification to a client device that has not joined the conference 518, such as client device 502. The notification may be transmitted based on a determination that one or more participants are previewing the conference 518 or have previewed the conference 518 within a predetermined period of time. The notification may be a pop-up message on a client device display to join the conference 518 when one or more participants are previewing the conference 518 or have previewed the conference 518 within a predetermined period of time. The notification may be transmitted when a threshold of a number of previewing participants is met. The notification may be transmitted when a high priority participant is previewing the conference 518 or has joined the conference 518.

In some situations, a user may not have received an invite for a particular meeting, either inadvertently or because the host was not aware that the user should be invited. In such a case, and in some implementations, the server 504 may be configured to transmit a notification to a client device to join a conference to which the user was not invited. For example, the server 504 may determine that the user should be invited based on historical conference data of the user and one or more other users of the system 500 that were invited to the conference.

Figure 6:
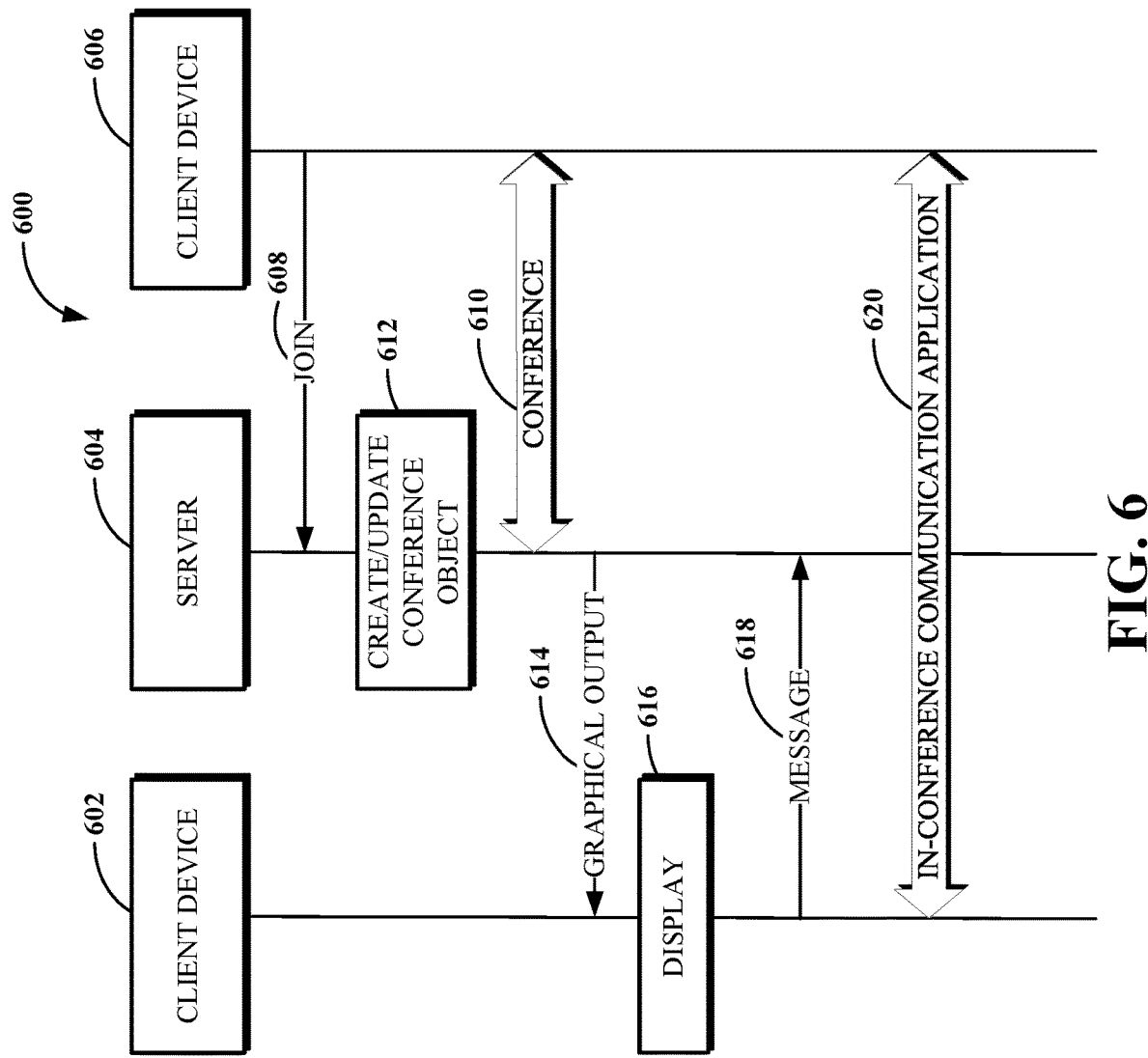
FIG. 6 is a swim lane diagram of an example of a system for providing a client device access to a conference messaging application without a connection between the client device and the conference.

FIG. 6 is a swim lane diagram of an example of a system 600 for providing a client device access to a conference messaging application without a connection between the client device and the conference. The system 600 includes a client device 602, a server 604, and a client device 606. The client device 602 may be the client device 402 shown in FIG. 4, and the client device 606 may be any one of the client devices 406A to 406N shown in FIG. 4. The server 604 may be the same as server 404 shown in FIG. 4, and may be used to implement the software platform 300 shown in FIG. 3. In an example, the functionality for providing access to conference participant information without having to join the conference may be implemented in the other software 318 shown in FIG. 3.

As shown in FIG. 6, client device 606 transmits a join message 608 to the server 604 to connect to a conference 610. The conference 610 may be a conference in progress, or it may be a conference that is initiated by the join message 608. The server 604 is configured to receive the join message 608 and create or update 612 a conference object associated with the conference 610. The server 604 grants the client device 606 access to the conference 610, and the client device 606 joins the conference 610, for example, via the conference software 410 shown in FIG. 4.

At this point, the client device 602 has not yet joined the conference 610. The server 604 may be configured to determine conference information based on the conference object. The conference information can include a conference description, a conference topic or list thereof, a conference start time, a conference end time, a conference location, participant information, or any combination thereof. The server 604 is configured to generate a graphical output 614 based on the conference information and transmit the graphical output 614 to the client device 602. The client device 602 is configured to receive the graphical output 614 and display 616 at least a portion thereof in an expanded portion of a panel associated with the conference 610 on a display of the client device 602. The graphical output 614 may include one or more visual indicators associated with the conference information.

The display 616 of the graphical output 614 may be triggered by an input to the client device 602 to expand the panel. The input can include hovering a cursor over the portion of the panel, touching the portion of the panel, or pressing one or more keys/buttons, for example, a keyboard shortcut. In this example, the expanded portion of the panel may display one or more participants that have joined the conference 610. The expanded portion of the panel may display an option to initiate a communication via an in-conference communication application with one or more participants that have joined the conference. The in-conference communication application is available for access by participants in the conference. The in-conference communication application may be a text or instant messaging application, an audio messaging application, or a video messaging application. In an example where the in-conference communication application is a text or instant messaging application, the option to initiate a communication may include one or more prewritten messages (e.g., "Coming from another meeting, I will be 5 minutes late," "Please get started without me," or "Please do not start without me"). The prewritten messages may be default messages generically available to various users of the conferencing software. Alternatively, the prewritten messages may be automatically generated using a ML model, user calendar data, historical conference data, and/or historical message data associated with the user of the client device 602. For example, if the user is in a conference with a group of participants that historically end conferences 10 minutes late, one or more prewritten messages may be automatically generated that include that the user will be 10 minutes late. In another example, if the user typically sends a message to start the meeting without their presence, a prewritten message such as "Please get started without me" may be automatically generated.

The user may provide another input that triggers the client device 602 to transmit a message 618 to the server 604. The input may be a single-click response to an option on the expanded portion of the panel. The message 618 may be a request to access an in-conference communication application to communicate with one or more conference participants. The server 604 is configured to receive the message 618 and grant access to the in-conference communication application 620 such that the client device 602 can communicate with one or more conference participants prior to joining the conference 610. In this example, when the access is granted, the client device 602 can communicate with client device 606 via the in-conference communication application 620 without joining the conference 610. In an example, if the user is a host of the conference 610, the user may notify one or more of the participants in the conference 610 that they are running late. If the user is not the host of the conference 610, the user may notify the host that they are running late.

In an example where a user may be in a vehicle and is unable to join a conference on time, the vehicle, or a component thereof, may be configured to transmit the message 618 to the server 604. In this example, the message 618 may be a prewritten message. The prewritten message may include an estimated time of arrival (ETA) based on navigation and/or traffic data to notify the one or more participants of the conference of an approximate time the user may join the conference. The ETA may include some buffer time to allow the user to park the vehicle and get set up for the conference.

In some implementations, the user may wish to post a message to a persistent chat room that is not associated with the conference 610, such as a chat room or other chat messaging space, which may, for example, be implemented using the messaging software 316 shown in FIG. 3. For example, a persistent chat room that has the same participants as the conference 610 may exist, and the user may wish to post a message in the persistent chat room for future reference. In this example, the server 604 may check for existing persistent chat rooms to determine whether a persistent chat room with matching participants of the conference 610 exists. If a match is found, the user can be presented with an option to post a message to the matching persistent chat room. In this way, messages communicable from the client device of the user may be posted to a space outside of the conference so that those messages may remain available and easily accessible to relevant users even after the conference has ended.

In some implementations, an agenda or list of topics for the conference 610 may be updated based on a chat message. For example, a user may indicate in the chat message that they will be 15 minutes late to join the conference. Based on the chat message, the server 604 determines that the list of topics may need to be updated. The server 604 may make this determination by searching the list of topics for items associated with the user and automatically updating the list of topics by moving any matching items associated with the user to later in the conference 610. In some examples, the server may update the list of topics to move the matching items to the end of the conference 610.

Figure 7:
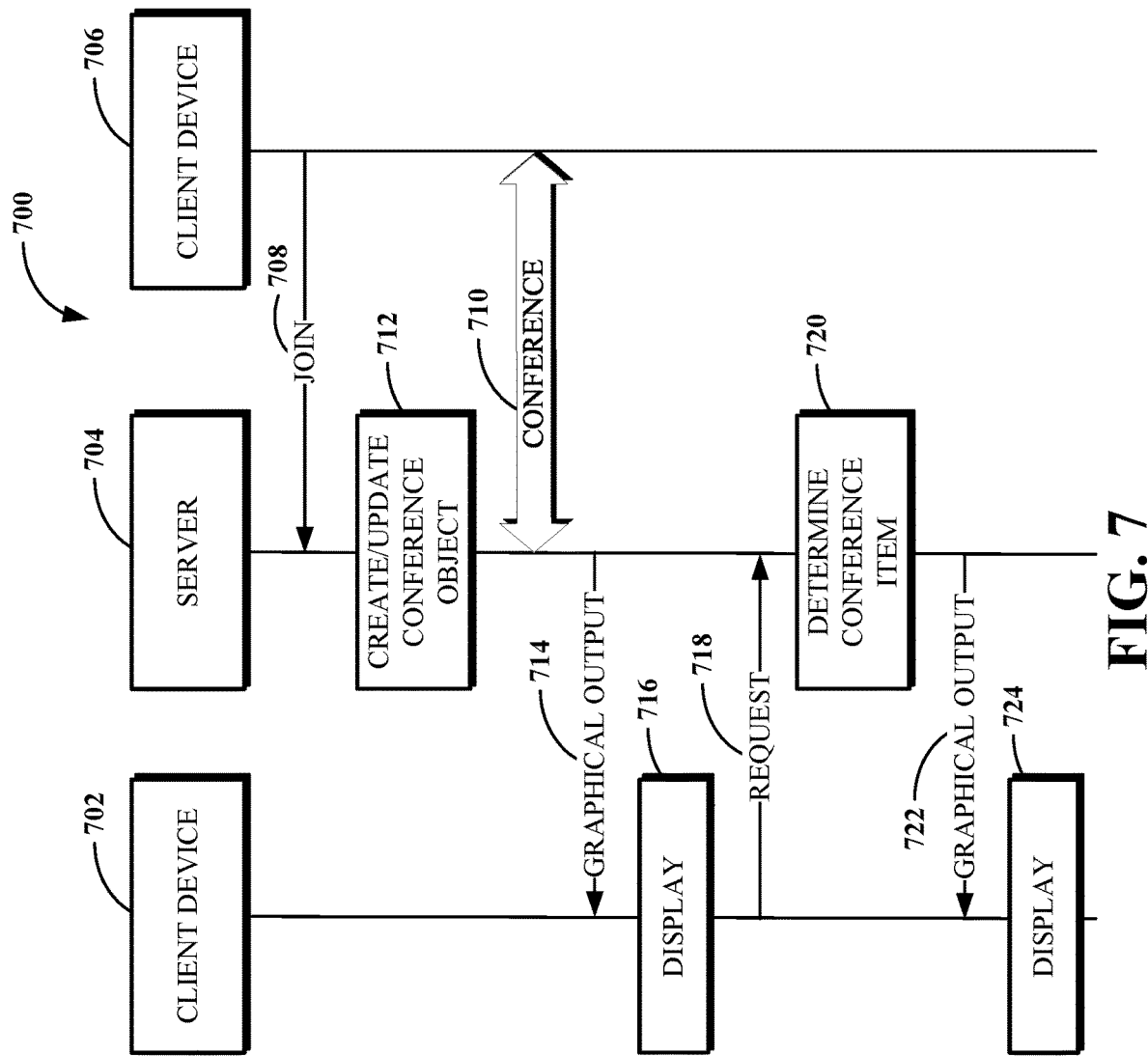
FIG. 7 is a swim lane diagram of an example of a system for providing a client device access to conference items without a connection between the client device and the conference.

FIG. 7 is a swim lane diagram of an example of a system 700 for providing a client device access to conference items without a connection between the client device and the conference. The system 700 includes a client device 702, a server 704, and a client device 706. The client device 702 may be the client device 402 shown in FIG. 4, and the client device 706 may be any one of the devices 406A to 406N shown in FIG. 4. The server 704 may be the same as server 404 shown in FIG. 4, and may be used to implement the software platform 300 shown in FIG. 3. In an example, the functionality for providing access to one or more conference items without having to join the conference may be implemented in the other software 318 shown in FIG. 3.

Certain conference items may be viewed prior to the initiation of the conference, for example, a list of topics or a downloadable file associated with the conference. The example shown in FIG. 7 is for a conference that is in progress. As shown in FIG. 7, client device 706 transmits a join message 708 to the server 704 to join a conference 710. The conference 710 may be a conference in progress, or it may be a conference that is initiated by the join message 708. The server 704 is configured to receive the join message 708 and create or update 712 a conference object associated with the conference 710. The server 704 grants the client device 706 access to the conference 710, and the client device 706 joins the conference 710, for example, via the conference software 410 shown in FIG. 4.

At this point, the client device 702 has not yet joined the conference 710. The server 704 may be configured to determine one or more conference items based on the conference object. In an example, the one or more conference items may be attachments or links included in a conference invite or a description included in the conference invite. The one or more conference items may include an editable document, a list of topics, a real-time transcript, a downloadable file, or a real-time presentation such as a screen share. The server 704 is configured to generate a graphical output 714 based on the one or more conference items and transmit the graphical output 714 to the client device 702. The client device 702 is configured to receive the graphical output 714 and display 716 at least a portion thereof in an expanded portion of a panel associated with the conference 710 on a display of the client device 702. The graphical output 714 may include one or more visual indicators associated with the one or more conference items. The visual indicators may be graphical representations of the one or more conference items, such as icons, thumbnails, text representations, or any combination thereof.

The display 716 of the graphical output 714 may be triggered by an input to the client device 702 to expand the panel. The input can include hovering a cursor over the portion of the panel, touching the portion of the panel, or pressing one or more keys/buttons, for example, a keyboard shortcut. In this example, the expanded portion of the panel may display one or more visual indicators associated with the conference items. The expanded portion of the panel may display an option to view and/or edit one or more of the conference items.

The user may provide another input that triggers the client device 702 to transmit a request 718 to the server 704. The request 718 may be a request to view or edit a conference item. The input may be a single-click response to an option on the expanded portion of the panel. The server 704 is configured to receive the request 718 and determine 720 a conference item based on the request 718. Determining the conference item may include obtaining the conference object and extracting data associated with the conference item. If the request 718 is a request to view the conference item, the server 704 may generate a graphical output 722 based on the data associated with the conference item. The server 704 is configured to transmit the graphical output 722 to the client device 702 for display. The client device 702 is configured to receive the graphical output 722 and display 724 at least a portion thereof in an expanded portion of the panel.

If the request 718 is a request to edit the conference item, the server 704 may grant the client device 702 access to edit the conference item. The server may open an application interface to allow the client device 702 to view and edit the conference item. When the edits to the conference item are completed, the server 704 may update the conference object to reflect the edits. In some examples, a notification may be sent to the other participants of the conference that the conference item has been edited. In some examples, a notification may be sent to the author of the conference item that the conference item has been edited.

In an example, the list of topics for the conference may be a living document that can be edited by conference participants. If the user is running late and cannot join the conference on time, the user can edit the list of topics to move one or more topics associated with the user to a later portion of the conference without having to join the conference.

Typical conferences begin with some idle conversations that are not related to the substance of the conference. In some implementations, the server 704 may detect when the idle conversation has ended and the substantive portion of the conference 710 has begun. For example, detection of the substantive portion of the conference 710 may be based on the initiation of a screen share or by using automated speech recognition and a ML model to detect whether the discussion of the list of topics has begun. The server 704 may transmit a notification to the client device 702 to notify the user that the substantive portion of the conference 710 has begun. In some examples, the notification may be a pop-up window on the display of the client device 702. The notification may include an option to join the conference 710.

In an example, a user may be running late for a conference and is in an area with substantial background noise. The user may wish to access an audio portion of the conference to listen in without having to join the conference. In this example, the user does not have to worry about muting their microphone. The server 704 may transmit a visual indicator to the conference attendees to notify them that the user is listening in.

In another example, a user may be running late for a webinar and wants to get caught up before joining the webinar. The user may access the conference items associated with the webinar without having to join the webinar. For example, the user may view the real-time transcript and/or a real-time presentation of the webinar without having to join the webinar. In some examples, the conferencing software may include a notes application that allows participants to take notes during the conference. The conferencing software may provide the participants with an option to make their notes public so that other conference participants can view their notes. The conferencing software may annotate the participant notes with timestamps for future reference.

In some implementations, the server 704 may automatically edit the list of topics based on a presence detection of a user. For example, the server 704 may detect that a user is running late based on a chat message from the user or determining that the user has not yet joined the conference. The server 704 may identify one or more items associated with the user and automatically move the identified items to the end of the list of topics. In some examples, the server 704 may identify one or more items associated with the user and change the font of the items to indicate that the discussion of the identified items may be delayed because the associated user has not yet joined the conference. In some examples, the server 704 may identify one or more items based on whether they are yet to be discussed or have already been discussed. When the associated user joins the conference, the server 704 may automatically change the font back to the original font. Changing the font may include a change to a different font type, underlining text, bolding text, italicizing text, highlighting text, changing a text color, changing a text size, or any combination thereof.

In some implementations, the server 704 may determine a conference importance level using a ML model. The conference importance level may be based on the list of topics, conference attendees, participant interactions in previous similar conferences, or any combination thereof. The server 704 may be configured to transmit a notification to a client device that includes a suggestion to join the conference or skip the conference based on the importance level of the conference to the user. For example, if the user is double-booked for multiple conferences scheduled at the same time, the notification of the importance level of each conference may help the user determine which conference to join.

Figure 8:
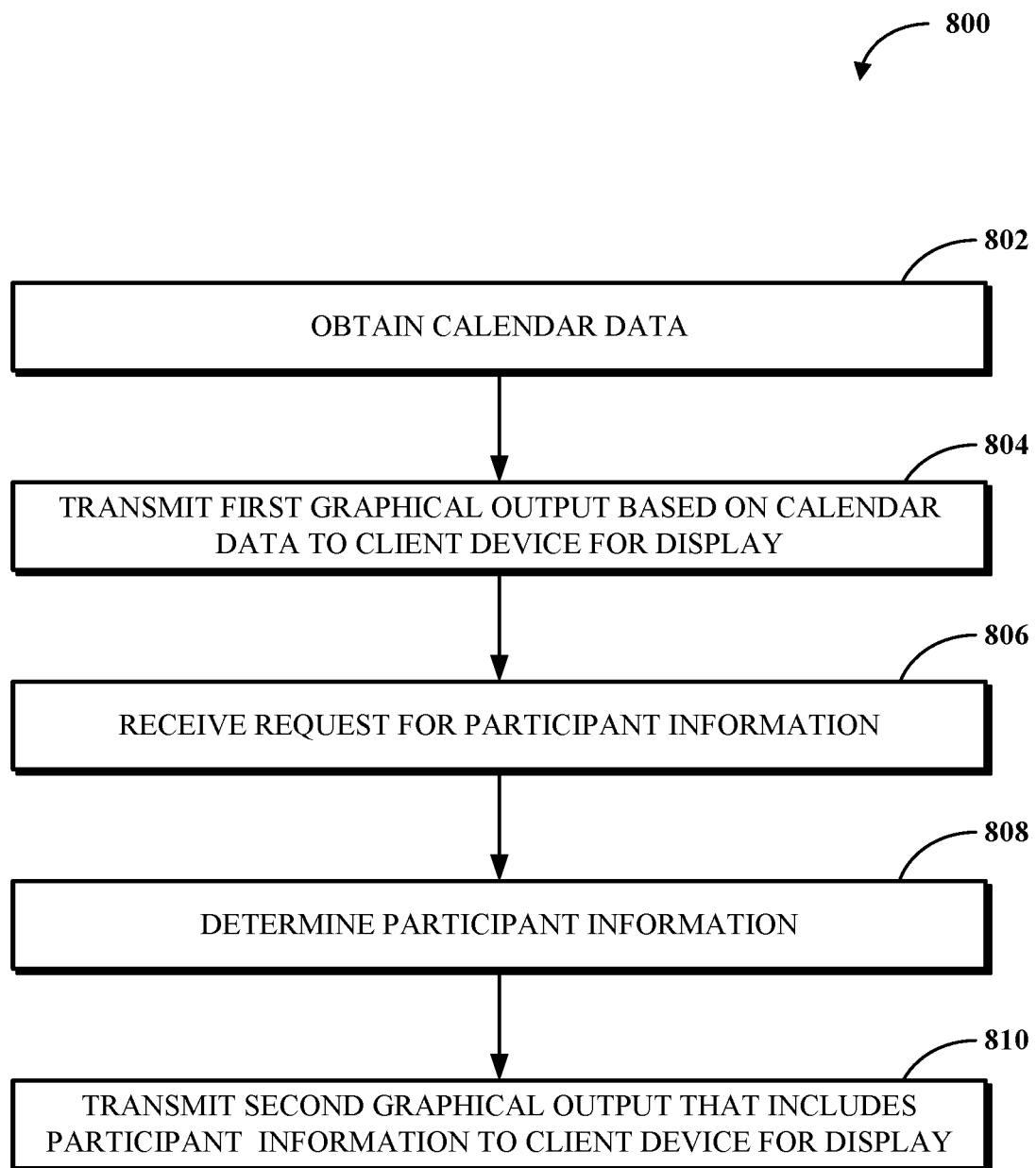
FIG. 8 is a flowchart of an example of a method for providing a client device access to conference participant information without a connection between the client device and the conference.
Figure 9:
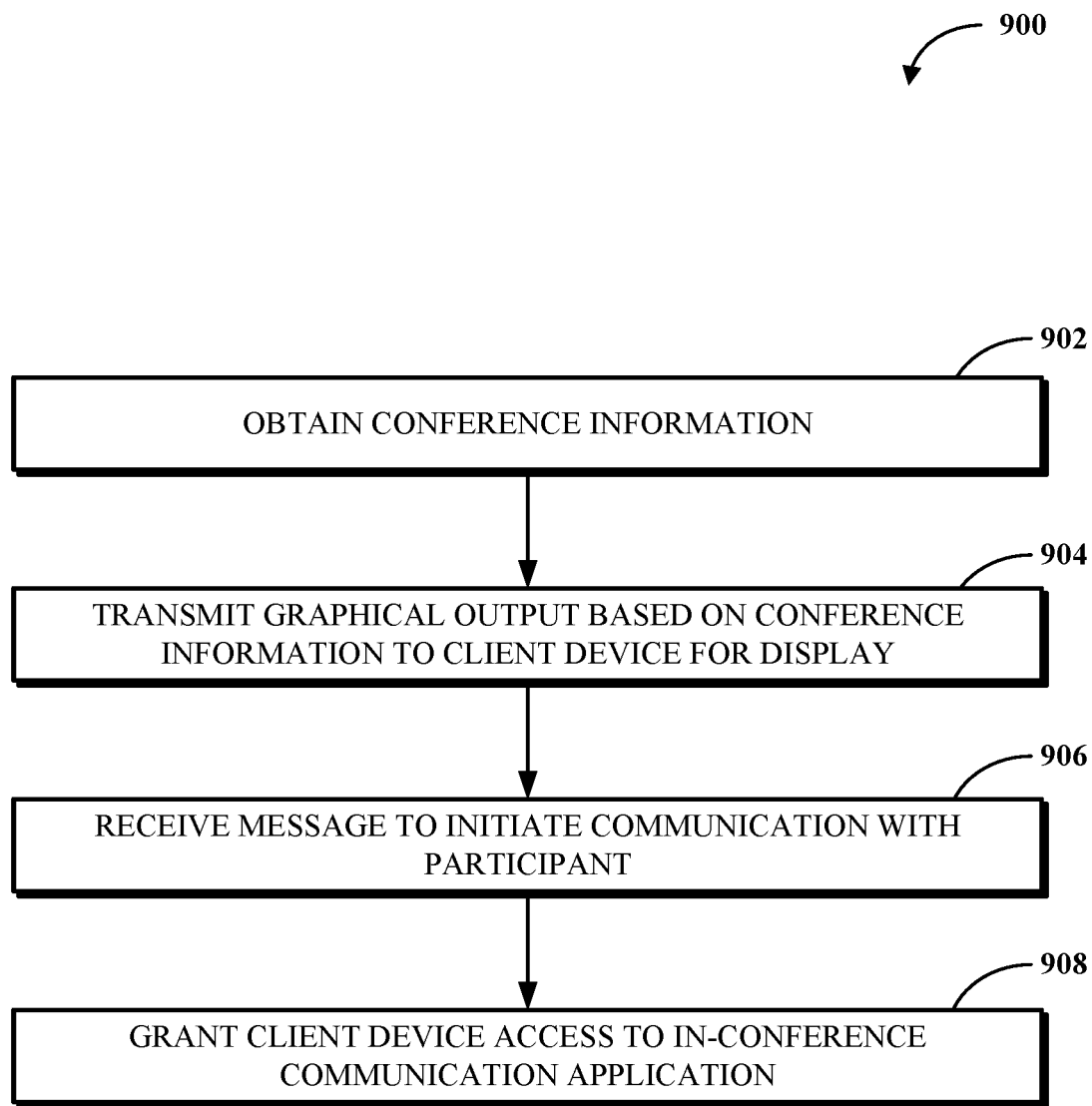
FIG. 9 is a flowchart of an example of a method for providing a client device access to a conference messaging application without a connection between the client device and the conference.
Figure 10:
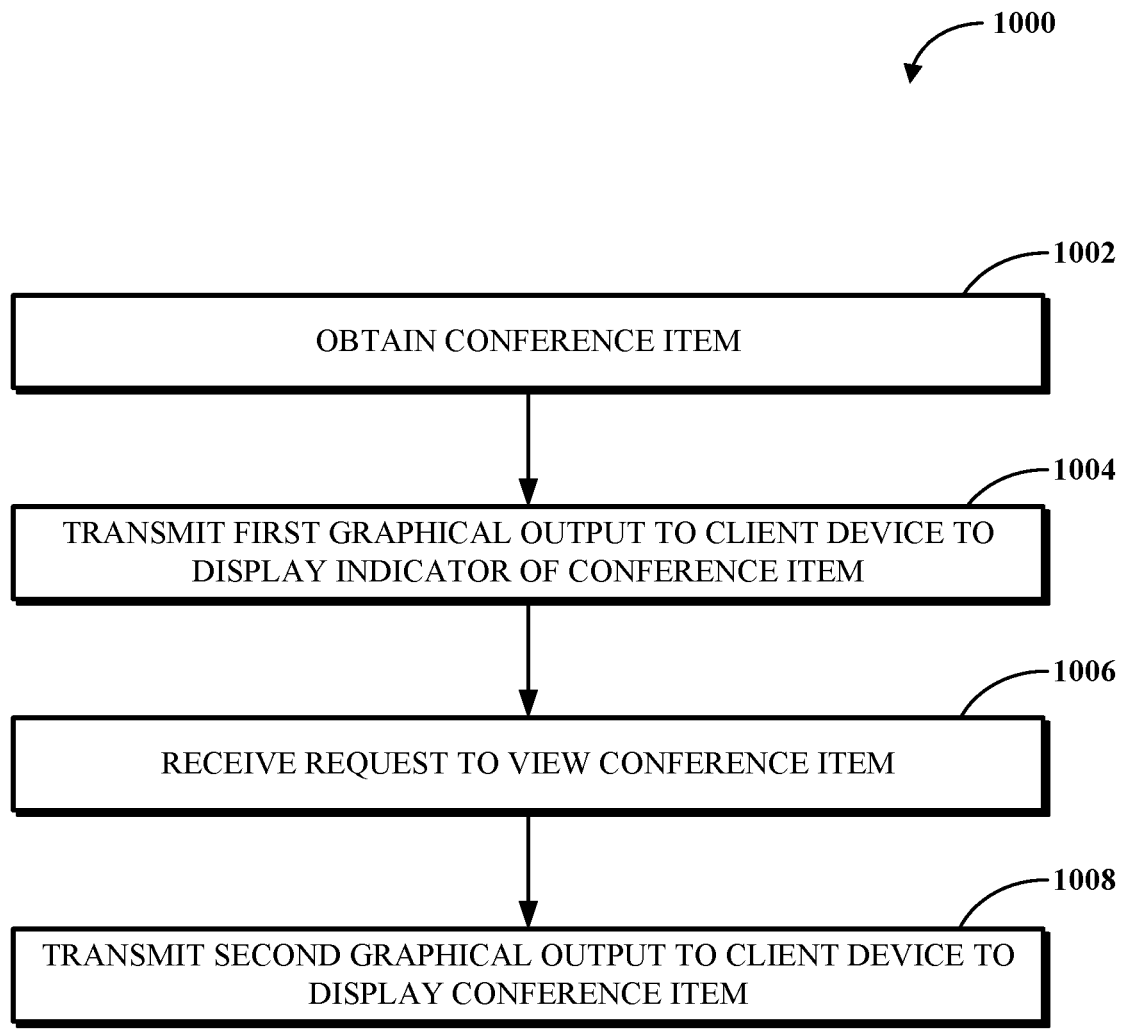
FIG. 10 is a flowchart of an example of a method for providing a client device access to conference items without a connection between the client device and the conference.

To further describe some implementations in greater detail, reference is next made to examples of methods that may be performed by or using a system for providing a client device access to conference features without a connection between the client device and a conference. FIGS. 8 through 10 are flowcharts of examples of methods for providing access to conference features prior to joining a conference. The methods can be executed using computing devices, such as the systems, hardware, and software described with respect to FIGS. 1 through 7. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 8 is a flowchart of an example of a method 800 for providing a client device access to conference participant information without a connection between the client device and the conference. At 802, calendar data is obtained by a server. The calendar data may include at least one of a description of a conference, a list of topics associated with the conference, a start time for the conference, an end time for the conference, a location, a participant identifier, a participant invite status, or any combination thereof.

At 804, the server transmits a first graphical output to a client device. The client device has not yet connected to the conference. The graphical output is based on the calendar data. The client device receives the first graphical output and displays at least a portion of the graphical output on a panel associated with the conference. The first graphical output may include a visual indicator that indicates a conference status. The conference status may indicate that the conference is a future conference, the conference has started without participants, the conference has started with participants, the conference that started and a high priority participant is in attendance, or the conference has ended. The panel may be a persistent panel that is an extensible panel that sits on a display of the client device to make the user aware of conference information or real-time communications in one or more modalities and to enable the user to take some action in response to the conference information or real-time communication in a single click regardless of the modality. The panel may be expanded to view additional information associated with the conference.

At 806, the server receives a request for participant information. The request is received prior to the client device joining the conference. The request may be received in response to an input from a user to expand the panel to view more information, such as participant information.

At 808, the server determines the participant information based on the request. The participant information may be determined based on the conference object, and may include a participant invite status for one or more participants, a participant attendance status for one or more participants, a participant attendance time for one or more participants, a participant preview status for one or more participants, a participant indicator for one or more participants, such as a participant name or title, or representation thereof, a participant audio status for one or more participants, a participant video status for one or more participants, a participant presentation status for one or more participants, or any combination thereof. Prior to the client device connecting to the conference, the server is configured to generate a second graphical output that includes the participant information.

At 810, the server transmits the second graphical output to the client device for display. Prior to connecting to the conference, the client device receives the second graphical output and displays at least a portion thereof in an expanded portion of the panel. The second graphical output may include one or more visual indicators. For example, a visual indicator may indicate whether a participant has their video or audio on or off based on the participant video status or the participant audio status. A visual indicator may indicate who is speaking in the conference based on the participant audio status. A visual indicator may indicate a duration of time that the participant has been in the conference based on participant attendance time. A visual indicator may indicate that a participant is performing a screen share based on the participant presentation status. A visual indicator may indicate whether the conference is being recorded based on the conference status.

In some implementations, the method 800 may include determining whether a high priority participant (e.g., a stakeholder) has joined the conference. The high priority participant may be determined based on an organizational chart relative to an organizational position of the user of the client device. In some examples, the high priority participant may be based on a preference of the user of the client device. The method may include transmitting a notification to the client device to notify the user that a high priority participant has joined or left the conference.

In some implementations, the method 800 may include determining that a threshold number of participants for a quorum is met and transmitting a notification to a client device that has not yet joined the conference to notify the user that the quorum threshold is met. The method 800 may include transmitting a notification to the client device when the quorum is lost, for example, when a participant leaves the conference.

In some implementations, the method 800 includes determining who is previewing the conference or how many participants are previewing the conference. The server may transmit a notification to a client device that has not yet joined the conference to notify the user that one or more participants are previewing the conference or have previewed the conference within a predetermined period of time.

FIG. 9 is a flowchart of an example of a method 900 for providing a client device access to a conference messaging application without a connection between the client device and the conference. At 902, a server obtains conference information. The conference information may be associated with a conference in progress and can include a conference description, a conference topic or list thereof, a conference start time, a conference end time, a conference location, participant information, or any combination thereof. The server obtains the conference information and generates a graphical output based on the conference information.

At 904, the server transmits the graphical output based on the conference information to a client device for display. The client device receives the graphical output and displays at least a portion thereof in an expanded portion of a panel associated with the conference on a display of the client device. The graphical output may include one or more visual indicators associated with the conference information. The display of the graphical output may be triggered by an input to the client device to expand the panel. The expanded portion of the panel may display an option to initiate a communication with one or more participants in attendance via an in-conference communication application, such as a conference messaging application.

At 906, the server receives a message to initiate a communication with a participant that is in attendance at the conference. The message is received prior to the client device joining the conference. The message may be transmitted to the server in response to an input received at the client device. The input may be a single-click response to an option on the expanded portion of the panel. The message may be a request to access an in-conference communication application to communicate with one or more conference participants.

At 908, the server grants the client device access to an in-conference communication application. The access to the in-conference communication application is granted prior to the client device joining the conference. When the access is granted, the client device can communicate with one or more of the participants in the conference via the in-conference communication application without joining the conference.

In some implementations, the message may include a prewritten message. In an example where the client device is a vehicle, or a component thereof, the prewritten message may include an ETA based on navigation and/or traffic data to notify one or more participants of the conference of an approximate time the user may join the conference. In some examples, the ETA may include some buffer time to allow the user to park the vehicle and get set up for the conference.

In some implementations, the method 900 may include posting a message to a persistent chat room that is not associated with the conference. For example, the method 900 may include checking for existing persistent chat rooms to determine whether a persistent chat room with matching participants of the conference exists. If a match is found, the method 900 may include transmitting a notification that includes an option to post a message to the matching persistent chat room to the client device.

In some implementations, the method 900 may include updating a list of topics based on a chat message. The method 900 may include determining that the list of topics should be updated based on the text of a chat message. For example, it may be determined from the text of the chat message that the user is running late for the conference. The method 900 may include searching the list of topics for items associated with the user and automatically updating the list of topics by moving any matching items associated with the user to later in the conference. In some examples, the method 900 may include transmitting a notification to the conference attendees that the list of topics has been updated.

FIG. 10 is a flowchart of an example of a method 1000 for providing a client device access to conference items without a connection between the client device and the conference. At 1002, a server obtains a conference item. The conference item may be an attachment or a link included in a conference invite or a description included in the conference invite. The conference item may include an editable document, a list of topics, a real-time transcript, a downloadable file, or a real-time presentation such as a screen share. The server obtains the conference item and generates a first graphical output based on the conference item.

At 1004, the server transmits the first graphical output to a client device to display an indicator of the conference item. The client device receives the first graphical output and displays at least a portion thereof in an expanded portion of a panel associated with the conference on a display of the client device. The first graphical output includes an indicator associated with the conference item. The indicator may be a visual indicator and may be a graphical representation of the conference item, such as an icon, a thumbnail, a text representation, or any combination thereof. The display of the first graphical output may be triggered by an input to the client device to expand the panel. The expanded portion of the panel may display an option to view and/or edit the conference item.

At 1006, the server receives a request to view the conference item. The request may be triggered by another input at the client device. The input may be a single-click response to an option on the expanded portion of the panel. The request may be a request to view or edit a conference item. The server generates a second graphical output based on the conference item indicated in the request.

At 1008, the server transmits the second graphical output to the client device to display the conference item. The client device receives the second graphical output and displays at least a portion thereof in an expanded portion of the panel or in an application that is compatible with the conference item.

In some implementations, the method 1000 may include detecting an initiation of a screen share. The method 1000 may include determining that a substantive portion of the conference has started based on the screen share. The substantive portion of the conference can be associated with an item of the list of topics. The method 1000 may include transmitting a notification to the client device that indicates that the substantive portion of the conference has started.

In some implementations, the method 1000 may include detecting a voice in an audio portion of the conference. The method 1000 may include converting the detected voice to text and comparing the text to the conference item. In this example, the conference item may be a list of topics. The method 1000 may include determining that a substantive portion of the conference has started based on the comparison, where the substantive portion of the conference is associated with an item of the list of topics. The method 1000 may include transmitting a notification to the client device that indicates that the substantive portion of the conference has started.

An aspect may include a method that includes transmitting, to a client device, a first graphical output for display on a panel interface associated with a conference. The panel interface may have a first portion and a second portion. The first portion may include an indicator that indicates that the conference is a future conference. Prior to the client device joining the conference, the method may include determining participant information based on a request. The method may include transmitting a second graphical output to the client device to display the participant information on the second portion of the panel interface prior to the client device joining the conference.

An aspect may include a system that includes a server and a client device. The server may be configured to transmit a first graphical output for display on a panel interface associated with a conference. The panel interface may have a first portion and a second portion. The first portion may include an indicator that indicates that the conference is a future conference. The client device may be configured to display the first graphical output on a display of the client device. Prior to the client device joining the conference, the server may be configured to determine participant information based on a request. The server may be configured to transmit a second graphical output to the client device to display the participant information on the second portion of the panel interface prior to the client device joining the conference.

An aspect may include a non-transitory computer-readable storage device including program instructions that, when executed by a processor, cause the processor to perform operations. The operations may include transmitting, to a client device, a first graphical output for display on a panel interface associated with a conference. The panel interface may have a first portion and a second portion. The first portion may include an indicator that indicates that the conference is a future conference. Prior to the client device joining the conference, the operations may include determining participant information based on a request. The operations may include transmitting a second graphical output to the client device to display the participant information on the second portion of the panel interface prior to the client device joining the conference.

In one or more aspects, a determination of whether a high priority participant has joined the conference may be made. In one or more aspects, a notification to the client device may be transmitted when a high priority participant has joined the conference. The determination of the high priority participant may be based on an organizational chart relative to an organizational position of a user of the client device. The determination of the high priority participant may be based on a user preference. In one or more aspects, the first graphical output may be associated with calendar data. In one or more aspects, the calendar data may include at least one of a description, an agenda, a list of topics, a time, a location, a participant identifier, or a participant invite status. In one or more aspects, the participant information may include a participant preview status, a participant icon, or a participant title. In one or more aspects, the user of the client device may be a non-host of the conference. In one or more aspects, the first graphical output may include a response option. In one or more aspects, the first graphical output may include a single-click response option.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   transmitting, to a client device, a first graphical output for display on a panel interface associated with a conference, the panel interface having a first portion and a second portion, the first portion including an indicator that indicates that the conference is a future conference;
   prior to the client device joining the conference:
   determining participant information based on a request; and
   transmitting a second graphical output to the client device to display the participant information on the second portion of the panel interface.

2. The method of claim 1, comprising:
   determining whether a high priority participant has joined the conference; and
   transmitting a notification to the client device that the high priority participant has joined the conference.

3. The method of claim 1, comprising:
   determining whether a high priority participant has joined the conference, wherein the high priority participant is determined based on an organizational chart relative to an organizational position of a user of the client device; and
   transmitting a notification to the client device when the high priority participant has joined the conference.

4. The method of claim 1, comprising:
   determining whether a high priority participant has joined the conference, wherein the high priority participant is based on a preference of a user of the client device; and
   transmitting a notification to the client device when the high priority participant has joined the conference.

5. The method of claim 1, wherein the first graphical output is associated with calendar data.

6. The method of claim 1, wherein the first graphical output is associated with calendar data and includes at least one of a description, a list of topics, a time, a location, a participant identifier, or a participant invite status.

7. The method of claim 1, wherein the participant information includes a participant preview status.

8. The method of claim 1, wherein a user of the client device is a non-host of the conference.

9. A system, comprising:
   a server configured to:
   transmit a first graphical output for display on a panel interface associated with a conference, the panel interface having a first portion and a second portion, the first portion including an indicator that indicates that the conference is a future conference; and
   a client device configured to display the first graphical output on a display of the client device;
   prior to the client device joining the conference, the server configured to:
   determine participant information based on a request; and
   transmit a second graphical output to the client device to display the participant information on the second portion of the panel interface.

10. The system of claim 9, wherein the server is configured to:
    determine whether a high priority participant has joined the conference.

11. The system of claim 9, wherein the server is configured to:
    transmit a notification to the client device based on a determination that a high priority participant has joined the conference.

12. The system of claim 9, wherein the server is configured to:
    transmit a notification to the client device when a high priority participant has joined the conference based on an organizational chart relative to an organizational position of a user of the client device.

13. The system of claim 9, wherein the server is configured to:

determine that a high priority participant has joined the conference based on a preference of a user of the client device.

14. The system of claim 9, wherein the participant information includes a participant icon.

15. A non-transitory computer-readable storage device including program instructions that, when executed by a processor, cause the processor to perform operations, the operations comprising:
- transmitting, to a client device, a first graphical output for display on a panel interface associated with a conference, the panel interface having a first portion and a second portion, the first portion including an indicator that indicates that the conference is a future conference;
- prior to the client device joining the conference:
  - determining participant information based on a request; and
  - transmitting a second graphical output to the client device to display the participant information on the second portion of the panel interface.

16. The non-transitory computer-readable storage device of claim 15, wherein the participant information includes a participant title.

17. The non-transitory computer-readable storage device of claim 15, wherein the first graphical output is associated with conference information that includes at least one of a description, an agenda, a time, a location, or a participant identifier.

18. The non-transitory computer-readable storage device of claim 15, wherein the first graphical output includes a response option.

19. The non-transitory computer-readable storage device of claim 15, wherein the first graphical output includes a single-click response option.

20. The non-transitory computer-readable storage device of claim 15, wherein the operations include:
- determining whether a high priority participant has joined the conference.

* * * * *